United States Patent [19]

Artrip et al.

[11] 4,068,153
[45] Jan. 10, 1978

[54] PLUGGING CONTROL

[75] Inventors: Robert W. Artrip, Northfield; Robert G. Klimo, Parma, both of Ohio

[73] Assignee: Towmotor Corporation, Mentor, Ohio

[21] Appl. No.: 626,503

[22] Filed: Oct. 28, 1975

[51] Int. Cl.² .............................................. H02P 3/10
[52] U.S. Cl. ..................................................... 318/373
[58] Field of Search ......................................... 318/373

[56] References Cited

U.S. PATENT DOCUMENTS

| | | | |
|---|---|---|---|
| 3,819,997 | 6/1974 | Morton et al. | 318/373 X |
| 3,843,912 | 10/1974 | Anderson | 318/373 X |
| 3,854,076 | 12/1974 | Lambert | 318/373 X |
| 3,936,709 | 2/1976 | Wright | 318/373 X |

Primary Examiner—Robert K. Schaefer
Assistant Examiner—W. E. Duncanson, Jr.
Attorney, Agent, or Firm—Phillips, Moore, Weissenberger, Lempio & Majestic

[57] ABSTRACT

A plugging control circuit in a silicon controlled rectifier (SCR) control for a series-connected direct-current vehicle-propulsion motor. The plugging control prevents the main SCR from pulsing when plug current is high, restarts the SCR pulsing when the plug current decays but with a reduced pulse width, and delays application of power through the main SCR for a time to allow the vehicle to first come to a halt before power is applied to move the vehicle in the opposite direction.

21 Claims, 2 Drawing Figures

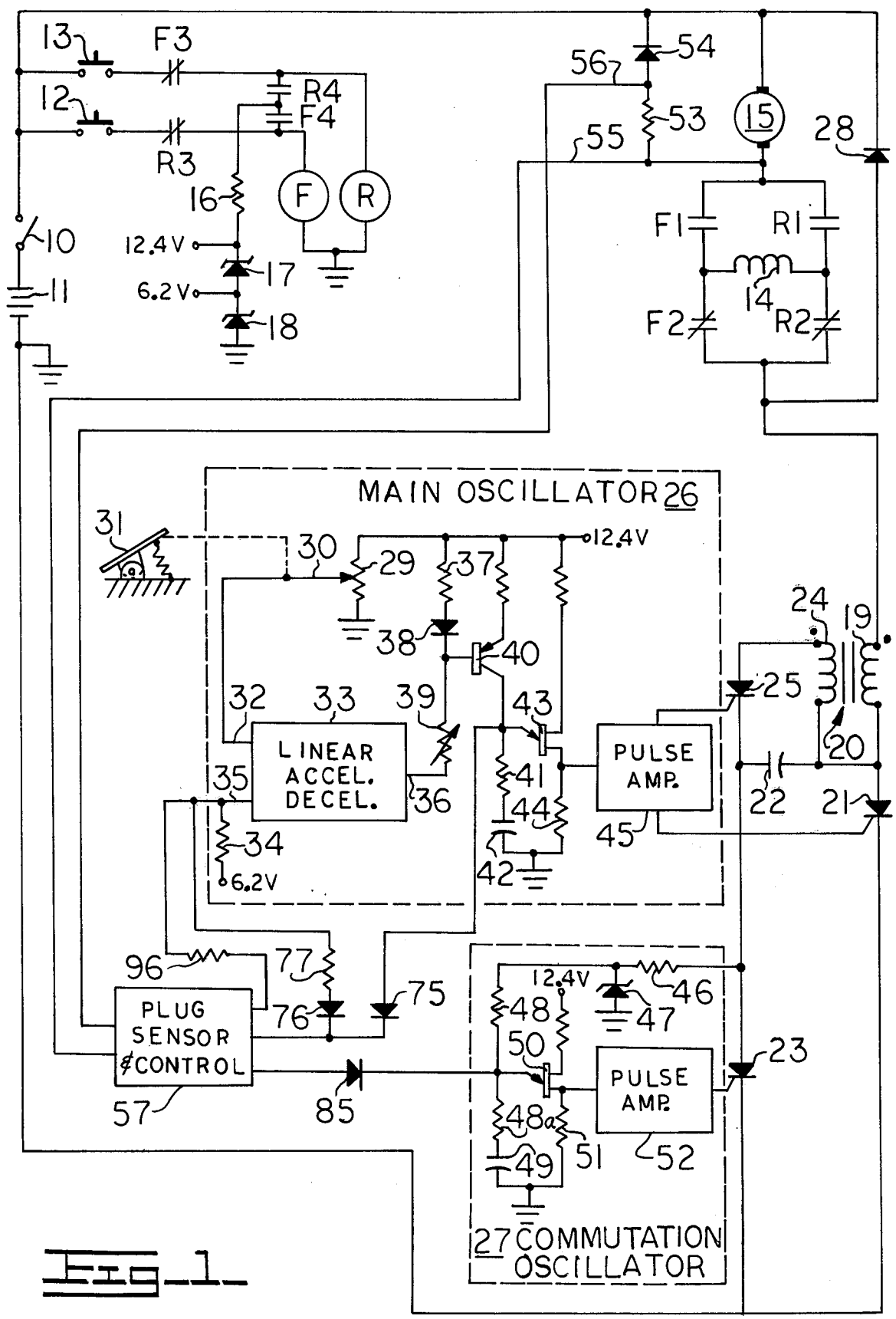

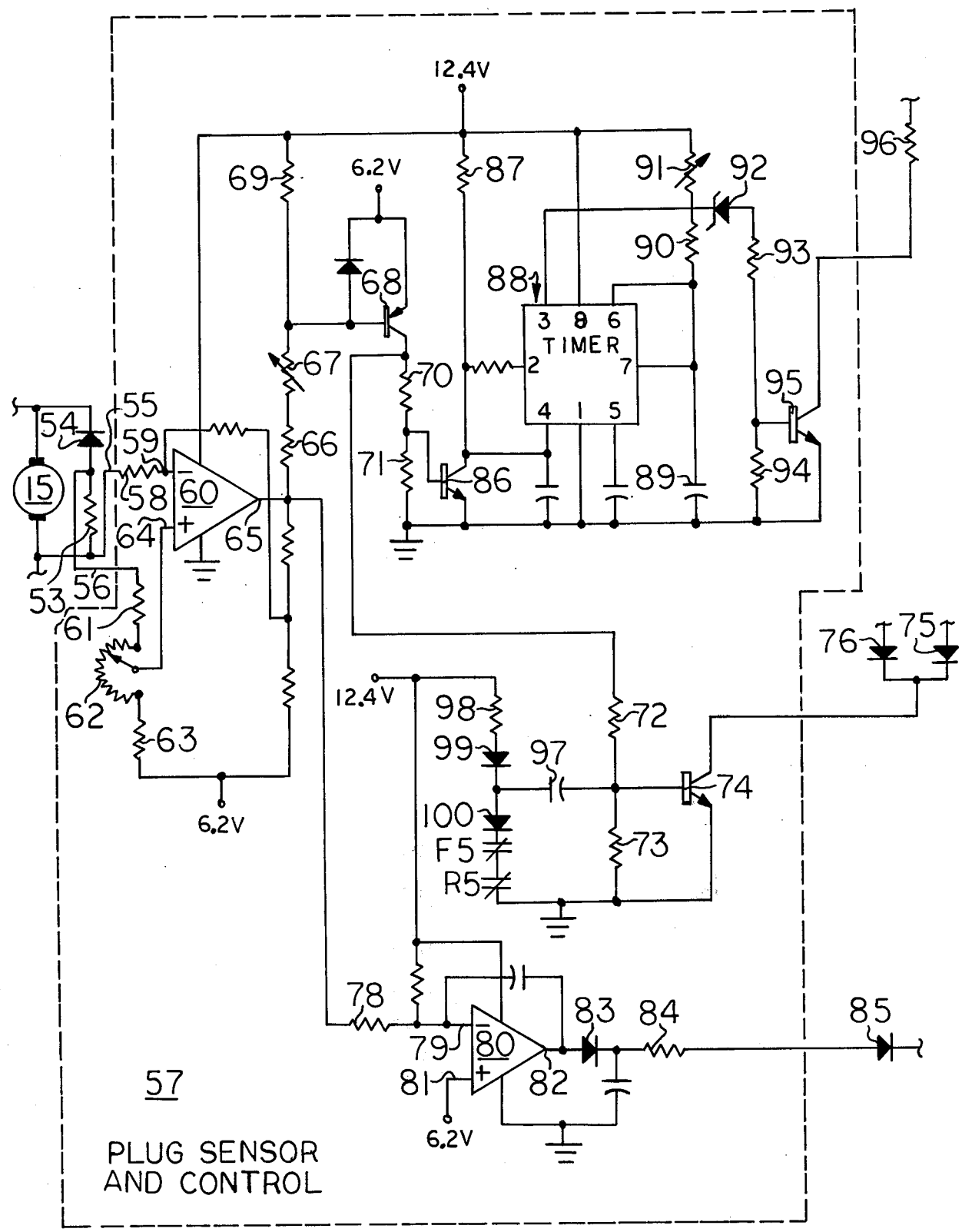
Fig_2_

PLUGGING CONTROL

BACKGROUND OF THE INVENTION

This invention relates to a control circuit utilizing silicon controlled rectifiers (SCR's) for controlling the operation of a series motor powered from a direct-current source.

It is well known that the direct current supplied to a direct-current motor from a power source of constant potential, such as a battery, may be selectively varied by controlling the average power to the motor, and that a solid state SCR can be used as a switching device to repeatedly connect and disconnect the battery to and from the motor. The power supplied to the motor is determined by the ratio between the time the SCR is turned on and is conducting and the time the SCR is turned off and is nonconducting.

Turning the SCR repeatedly on and off will allow a series of pulses of current to flow through the SCR and the motor, the frequency of pulses being determined by the number of times the SCR is turned on per unit time and the duration or pulse width being determined by the length of time that the SCR remains on before it is turned off. If the pulse width remains constant, the ratio of on-time to off-time will vary directly as the pulse frequency. As the pulse frequency increases, the off-time (between the time the SCR is turned off and the time it is turned back on) will decrease, and more power will be delivered to the load.

The average power delivered to the load may also be varied by maintaining the same pulse frequency and varying the pulse width. A longer pulse width will cause more power to be delivered to the motor than will a shorter pulse width.

Typically, SCR control systems include a main SCR which is connected in series with the motor and the battery and a pulse generator which repeatedly supplies gate pulses to turn the main SCR on. A commutating capacitor is provided which will charge in a commutating direction through a charging SCR. The charging is typically done when the main SCR is conducting. At the appropriate time, a commutating SCR is turned on to connect the charged capacitor across the main SCR and divert current therefrom so that the main SCR is reversely biased and will turn off.

When a vehicle is traveling under power in one direction, braking may be accomplished by reversing the connection of the field to the armature. With the direction of current flow through the field being reversed, the motor will act as a generator, generating current flow (commonly referred to as plug current) through the armature which provides dynamic braking of the vehicle.

When the motor is plugging it is desirable to discontinue operation of the main SCR so that no power is delivered therethrough to the motor until the plug current decays to a safe level. Even then, when the main SCR is reactivated to supply power therethrough to the plugging motor it is desirable to supply only a small amount of power therethrough so that the vehicle can be brought to a smooth and controlled halt before the direction of the vehicle is reversed. Once the vehicle has come to a halt, normal operation of the main SCR should be resumed so that the vehicle will accelerate in the reverse direction.

A problem which exists in vehicles having present SCR controls is that plug current is sensed and used to control the resumption of normal SCR operation to move the vehicle in the opposite direction when the plug current has ceased. Very often the plug current will decay to such a low level that the plug current sensor will consider plug current to have ceased and will cause the SCR control to apply power to the motor for opposite motion even though the vehicle had not yet come to rest. This will cause a harsh, abrupt stop at the end of a relatively smooth plugging stop. This has been found to be especially undesirable in the operation of loaded fork-lift trucks, plugging from forward direction, since the abrupt stop causes forward tilting of the load and causes the rear steering wheels to lift up and lose steering contact with the ground.

SUMMARY OF THE INVENTION

The present invention provides an improved plugging control for controlling the operation of the main and commutating oscillators of an SCR control for a series-connected direct-current motor during plugging of the motor.

The plugging control senses plug current and shuts down the main oscillator when plug currents are above a predetermined level so that no battery current can flow to the motor through the main SCR at such time. The plugging control also causes the commutation oscillator to gate the commutating SCR on earlier than normal during plugging so that when the main oscillator is turned back on during plugging, only narrow current pulses will be delivered through the main SCR. Additionally, when the plug current has decayed to a readily sensed level, a timer is activated which delays reapplication of power for vehicle motion in the reverse direction for a time sufficient to ensure that the vehicle has first come to a halt before such power is applied.

Further objects and advantages will be apparent in the course of the following detailed description.

BRIEF DESCRIPTION OF THE DRAWINGS

In the drawings, wherein like parts are identified by like numerals throughout the same, FIG. 1 is a schematic drawing of an SCR control for a series-connected direct-current motor utilizing the plug sensor and control circuit of the present invention; and FIG. 2 is a schematic drawing of the plug sensor and control circuit of FIG. 1.

DESCRIPTION OF THE PREFERRED EMBODIMENT

Referring now to the drawings, wherein is shown a preferred embodiment of the invention, and in particular to FIG. 1, main switch 10 enables a source of direct current, e.g., battery 11, to be connected to the circuit. Direction switches 12 and 13 are provided to alternatively energize one of the forward (F) or reverse (R) relay coils, to connect the field winding 14 in series with the armature 15 by means of the main forward contacts F1 and F2 or the main reverse contacts R1 and R2. Energization of the forward relay coil F or the reverse relay coil R will actuate all of the F1 through F5 or R1 through R5 contacts.

With main switch 10 closed, and one of the direction switches, e.g., forward switch 12, closed, current from the battery can flow through the now closed F4 contact and resistor 16 to develop regulated +12.4-volt and +6.2-volt supplies across zener diodes 17 and 18, these supplies being used to power the control circuits described below.

Also with the main switch 10 and one of the direction switches closed, a current path is provided from the battery through the armature and field winding, primary 19 of pulse transformer 20 and the main silicon controlled rectifier (SCR) 21.

A commutating capacitor 22 is connected in series with commutating SCR 23, the capacitor 22 and SCR 23 being in parallel with the main SCR 21. A charging path for capacitor 22 is provided by the loop comprised of capacitor 22, the secondary 24 of pulse transformer 20 and the charging SCR 25.

In operation, pulses from the main pulse generator 26 are applied to the gates of the main and charging SCR's 21 and 25. With the main SCR gated on, current will flow through the motor and primary of pulse transformer 20. Current flow will be induced in the secondary 24 and will flow through SCR 25 to charge the commutating capacitor 22 so that its left plate is charged positively relative to its right plate. When the capacitor is so charged SCR 25 will commutate.

Subsequently, a pulse is applied from the commutation oscillator 27 to the gate of the commutating SCR 23 to turn it on and connect the charged capacitor 22 across the main SCR 21 so that the charge on the capacitor will commutate the main SCR.

The SCR's are now ready to recycle when the main and charging SCR's are again turned on by the main oscillator 26. Current through the motor is maintained while the main SCR is off by means of flyback diode 28 connected across the motor terminals.

The main oscillator 26 is shown in fuller detail in the application of Robert G. Klimo and Robert W. Artrip entitled "Firing Control Oscillator for a Solid State Switch", Ser. No. 626,610, filed concurrently herewith and assigned to the assignee of the present application, the disclosure of said application being incorporated herein by reference. For the purpose of the present invention, the main oscillator 26 includes a variable resistor 29 whose wiper 30 is actuated by a foot-operated accelerator pedal 31. The voltage at the wiper is applied to input 32 of the linear accelerate-decelerate circuit 33, and a reference potential is applied through resistor 34 to the other input 35 thereof. Circuit 33 will produce a voltage at its output 36 which will vary linearly in accordance with changes in the voltage at input 32, i.e., in accordance with the position of the accelerator pedal 31. Current will flow through resistor 37, diode 38 and variable resistor 39 in a magnitude dependent upon the magnitude of the output of circuit 33. This in turn varies the bias on the base of transistor 40 so that the magnitude of its conduction also depends on the output of circuit 33. Current thus flows through transistor 40, resistor 41 and timing capacitor 42 at a controlled rate. When the voltage across capacitor 42 increases to a sufficient level, it will turn on unijunction transistor 43 and capacitor 42 will discharge through transistor 43 and resistor 44. The pulse of current through resistor 44 is amplified by pulse amplifier 45 and applied to the gates of the main and charging SCR's 21 and 25. Thus, the frequency of pulse generation will be dependent upon the position of the operator-controlled foot pedal 31. The minimum or "creep" frequency of the oscillator is set by the adjustment of variable resistor 39.

The commutation oscillator 27 obtains a voltage from the left plate of commutating capacitor 21 and regulates this voltage by resistor 46 and zener diode 47. The regulated voltage is applied to and causes current flow through resistor 48, resistor 48a and timing capacitor 49. When the voltage across capacitor 49 rises sufficiently, it will turn on transistor 50, allowing the capacitor to discharge through transistor 50 and resistor 51. The pulse developed across resistor 51 is amplified by pulse amplifier 52 and used to gate on the commutating SCR 23. When SCR 23 is gated on, commutating capacitor 22 will discharge so that timing capacitor 49 cannot recharge. It will recharge, however, once commutating capacitor 22 is recharged in the next cycle of operation. Thus, the commutation oscillator will generate a single pulse each time the main and charging SCR's turn on and the commutating capacitor is charged, the single pulse being delayed (to set the pulse width of the main SCR) for a time determined by the RC time constant of resistor 48 and timing capacitor 49.

Thus, in normal drive mode, e.g., if direction switch 12 is closed and the vehicle is moving forwardly under power, main oscillator 26 will turn the main SCR on at a rate controlled by the operator, and the commutation oscillator will cause the main SCR to be turned off at a predetermined time after it is turned on.

If the forward direction switch 12 is opened and the reverse switch 13 is closed while the vehicle is moving forwardly, the direction relay contacts F1, F2, R1 and R2 will cause the connections of the field winding 14 to the armature 15 to be reversed. Armature 15 will generate plug current which flows through resistor 53 and plug diode 54 and develops a potential across resistor 53 proportional to the amount of plug current therethrough. Lines 55 and 56 deliver the potential across resistor 53 to the plug sensor and control circuit 57, which is shown in detail in FIG. 2.

Line 55 is connected through resistor 58 to input 59 of differential amplifier 60. Line 56 is connected through resistor 61, variable resistor 62 (plug balance adjustment) and resistor 63 to +6.2 volts. The wiper of variable resistor 62 thus inputs a fixed level reference voltage to input 64 of amplifier 60. When plug current exists, the differential amplifier develops at its output 65 a voltage which is negative with respect to +6.2 volts and proportional to the plug current.

The output of differential amplifier 60 is connected through resistor 66 and variable resistor 67 (plug distance adjustment) to the base of transistor 68. The emitter of transistor 68 is connected to +6.2 volts. A reference current from +12.4 volts flows through resistor 69 to the base of transistor 68 which normally reverse-biases the base so that transistor 68 is turned off. When the current from the output of differential amplifier 60 flowing through resistors 66 and 67 exceeds the reference current, transistor 68 turns on. Current can now flow through transistor 68 and the two parallel paths, one path comprising resistors 70 and 71 and the other path comprising resistors 72 and 73.

The current flowing through resistors 72 and 73 turns on transistor 74 so that its collector voltage drops to ground. This low potential is coupled by diode 75 to the base of unijunction transistor 43 in the main oscillator to discharge timing capacitor 42 and prevent the main oscillator from generating any more gate pulses. The low collector voltage of transistor 74 is also coupled by diode 76 and resistor 77 to the input 35 of the linear accelerate-decelerate circuit 33 of the main oscillator.

Thus when the plug current exceeds a predetermined level, the main oscillator 26 will be shut down. When the plug current diminishes to a value that allows the reference current through resistor 69 to turn off transistor 68, transistor 74 will be turned off, allowing the main oscillator to resume pulse generation.

The output of differential amplifier 60 is also connected through resistor 78 to the inverting input 79 of comparator 80. The non-inverting input 81 is connected to +6.2 volts. Since the output 65 of differential amplifier 60 is negative with respect to +6.2 volts whenever there is detectable plug current, the output 82 of comparator 80 will be high whenever there is detectable plug current. This high output is coupled by diode 83, resistor 84 and diode 85 to the base of the unijunction transistor 50 of the commutation oscillator 27. As a result, timing capacitor 49 can charge through resistor 84 as well as resistor 48. This will reduce the charging time so that the commutation oscillator will pulse early. Thus, whenever there is detectable plug current the time constant of the commutation oscillator is reduced. As a consequence, when the main oscillator is turned back on during plugging, the pulse width of the pulses through the main SCR is reduced so that the power delivered to the motor is decreased even though the accelerator pedal may be in the same position.

When plug current ceases, or drops to such a low level that the output of differential amplifier 60 is no longer negative with respect to +6.2 volts, the output of comparator 80 goes low. This low voltage is blocked from the commutation oscillator 27 by diode 85 and the commutation oscillator resumes normal operation.

As mentioned previously, when the plug current is sufficient to cause transistor 68 to turn on, current will flow through resistors 70 and 71. Such current flow turns transistor 86 on. Current flow through resistor 87 applies a negative trigger pulse to reset pin 4 of an integrated timer circuit such as a commercially available Signetic 555 timer 88. Timing capacitor 89 is thus shorted to ground through an internal connection between pins 7 and 1 of the timer. The output at pin 3 is low.

When the plug current reduces to a degree sufficient to turn transistor 68 off, transistor 86 will likewise be turned off. The collector voltage of transistor 86 goes high, inputting a positive pulse to the trigger pin 2 of timer 88. This removes the short between pins 1 and 7 so that capacitor 89 is no longer shorted to ground, and also drives the output pin 3 high.

Capacitor 89 is now free to charge through resistor 90 and variable resistor 91 (time delay adjustment). The charge on capacitor 89 will increase exponentially at a rate determined by the RC time constant of resistors 90 and 91 and capacitor 89. When the charge on capacitor 89 reaches 2/3 of the 12.4-volt supply, the timer 88 causes the capacitor 89 to discharge rapidly through pins 7 and 1 to ground and causes the output pin 3 to be driven low. Thus, when transistor 68 is turned off after plug current has decayed, output pin 3 of timer 88 is high for a time period determined by the above RC timing circuit.

The output pin 3 of timer 88 is connected by zener diode 92 to resistors 93 and 94. When output pin 3 is high, transistor 95 is turned on. Its collector is coupled by resistor 96 to the input of the linear accelerate-decelerate circuit 33 of the main oscillator thereby reducing the voltage applied thereto from its normal reference. As a result the main oscillator will only pulse at the low creep speed rate determined by the adjustment of creep speed variable resistor 39.

The time constant of timer 88 is chosen so that transistor 95 will remain on for a time sufficient to ensure that the vehicle will come to a full halt during the time delay period. After the time delay period is over, the output pin 3 of timer 88 goes low and turns transistor 95 off. The main oscillator is now released for normal operation.

As has been described previously, transistor 74 is used during times of high plug current to prevent the main oscillator 26 from generating gate pulses for the main SCR 21. Transistor 74 is also used in the following manner to prevent the main oscillator 26 from generating gate pulses for the main SCR for a predetermined time period after the direction of the vehicle has changed so that an immediate plug pulse is avoided.

During normal non-plugging operation, as for example when the vehicle is moving forwardly, the forward (F) relay coil will be energized and its normally closed auxiliary contacts F5 (FIG. 2) will be open. Capacitor 97 will have charged through resistor 98, diode 99 and resistor 73 so that the left plate of capacitor 97 will be high and its right plate low. Transistor 74 will be off and the main oscillator will function normally.

If the operator now wishes to change direction, the forward relay coil F is de-energized and the reverse relay coil R is energized. The auxiliary contacts F5 will close, but the normally closed auxiliary contacts R5 will not open until the main contacts R1 close completely. With both auxiliary contacts F5 and R5 closed, capacitor 97 will discharge through diode 100 so that both plates thereof are at about the same potential.

When the R5 contacts open, the left plate of capacitor 97 is brought up to 12.4 volts through resistor 98 and diode 99. Since the voltage across the capacitor 97 is essentially zero, transistor 74 immediately turns on and prevents the main oscillator from generating a gate pulse. In due course, typically 2–3 milliseconds, capacitor 97 charges through resistors 98 and 73 to a degree sufficient to turn transistor 74 off. The main oscillator is then released for normal pulse generating operation.

The same sequence of operations will occur if the direction of movement of the vehicle is changed from reverse to forward.

What is claimed is:

1. In a system for controlling the power delivered from a source of direct current to a motor having a field and armature connected in series including a main silicon controlled rectifier connected between the motor and said source, a main pulse generator for repeatedly gating the main silicon controlled rectifier into conduction at a controlled rate normally dependent upon the position of an operator-actuated accelerator control, a commutating capacitor, silicon controlled rectifier which when gated into conduction will connect the commutating capacitor across the main silicon controlled rectifier, a commutation pulse generator for normally gating said commutating silicon controlled rectifier into conduction a predetermined time after the main silicon controlled rectifier is gated into conduction, a forward relay having a relay coil and main contacts for connecting the field in one direction to the armature when said forward relay coil is energized to enable said armature to be driven in a forward direction by power from said battery and to enable said motor to function as a generator and produce plug current when said armature is being rotated in a reverse direction, a reverse relay having a relay coil and main contacts for connecting the field in the opposite direction to the armature when said reverse relay coil is energized to enable said armature to be driven in a reverse direction by power from said battery and to enable said motor to function as a generator and produce plug current when said armature is being rotated in a forward direction, means for de-energizing and energizing said relays to effect a reverse-to-forward reversal of the connection of the field during forward rotation of the armature and to effect a forward-to-reverse reversal of the connection of the field to the armature during reverse rotation of said armature, the improvement comprising:
 a. timing means having a time period,
 b. means responsive to a reverse-to-forward reversal of the connection of the field to the armature during forward rotation of the armature and responsive to a forward-to-reverse reversal of the connection of the field to the armature during reverse rotation of the armature for starting said timing means into operation,
 c. means responsive to operation of said timing means and operable during said time period for preventing said main pulse generator from responding normally to the position of said accelerator control during said time period.

2. The system as set forth in claim 1, the improvement further being that said timing means (a) includes a resistance and a timing capacitor connected in series across a source of regulated voltage, that said means (b) includes normally closed relay contacts actuated by each of said forward and reverse relay coils, said relay contacts being in series with each other and across said timing capacitor, and that said means (c) includes means responsive to charging of said timing capacitor to a predetermined voltage for preventing said main pulse generator from gating said main silicon controlled rectifier into conduction during said charging.

3. The system as set forth in claim 2, the improvement further being that said means (c) includes a normally non-conducting transistor which when conducting will prevent said main pulse generator from gating said main silicon controlled rectifier into conduction, said transistor being connected to said timing capacitor for turning on of said transistor when said timing capacitor charges to said predetermined voltage, the improvement further comprising:
 d. means responsive to the presence and level of plug current and connected to said transistor for turning on said transistor when the plug current is above a predetermined level.

4. The system as set forth in claim 2, the improvement further comprising:
 d. a second timing means having a time period,
 e. means for detecting the presence and level of said plug current,
 f. means responsive to the plug current being below a predetermined level for starting said timing means into operation,
 g. means responsive to operation of said second timing means and operable during the time period thereof for preventing said main pulse generator from responding normally to the position of said accelerator control during said time period.

5. The system as set forth in claim 4 and wherein the main pulse generator has a predetermined minimum "creep" frequency of operation, the improvement further being that said means (g) is operable during said time period to control said main pulse generator and limit operation thereof to said creep frequency.

6. The system as set forth in claim 5, the improvement further comprising:
 h. means responsive to the presence and level of plug current for preventing said main pulse generator from gating said main silicon controlled rectifier into conduction when said plug current is above a predetermined level and for allowing said main pulse generator to gate said main silicon controlled rectifier into conduction when said plug current is below said predetermined level.

7. The system as set forth in claim 6, the improvement further comprising:
 i. means responsive to the presence of plug current for causing said commutation pulse generator to gate said commutating silicon controlled rectifier into conduction prior to the normal predetermined time during presence of plug current.

8. The system as set forth in claim 1 the improvement further being that said means (b) includes (i) means for detecting the presence and level of said plug current, and (ii) means responsive to the plug current being below a predetermined level for starting said timing means into operation.

9. The system as set forth in claim 8, the improvement further including:
 d. means responsive to the plug current being above said predetermined level for resetting said timing means.

10. The system as set forth in claim 1 and wherein the main pulse generator has a predetermined minimum "creep" frequency of operation, the improvement further being that said means (c) is operable during said time period to control said main pulse generator and limit operation thereof to said creep frequency.

11. The system as set forth in claim 1, wherein said main pulse generator includes a series-connected resistor and capacitor and wherein said main pulse generator gates said main silicon controlled rectifier into conduction when said capacitor charges to a predetermined voltage, the improvement further comprising:
 d. means responsive to the presence and level of plug current for discharging said capacitor and maintaining said capacitor discharged when said plug current is above a predetermined value and for allowing said capacitor to charge when said plug current is below said predetermined value.

12. The system as set forth in claim 11, the improvement further comprising:
 e. means responsive to the presence of plug current for causing said commutation pulse generator to gate said commutating silicon controlled rectifier into conduction prior to the normal predetermined time during presence of plug current.

13. The system as set forth in claim 8, wherein said main pulse generator includes a series-connected resistor and capacitor and wherein said main pulse generator gates said main silicon controlled rectifier into conduction when said capacitor charges to a predetermined voltage, the improvement further comprising:
 d. means responsive to the presence and level of plug current for discharging said capacitor and maintaining said capacitor discharged when said plug current is above a predetermined value and for allowing said capacitor to charge when said plug current is below said predetermined value.

14. In a system as set forth in claim 13, the improvement further comprising:

e. means responsive to the detected presence of plug current for causing said commutation pulse generator to gate said commutating silicon controlled rectifier into conduction prior to the normal predetermined time during presence of plug current.

15. The system as set forth in claim 1, wherein the main pulse generator has a predetermined minimum "creep" frequency of operation, the improvement further being that said means (b) includes (i) means for generating a first signal proportional to the level of plug current, (ii) means for generating a reference signal, (iii) means for detecting whether the level of said first signal is above or below the level of said reference signal, and (iv) means responsive to the level of said first signal being below the level of said reference signal for starting said timing means into operation, and that said means (c) is operable during said time period of said timing means to control said main pulse generator and limit operation thereof to said creep speed.

16. The system as set forth in claim 15, the improvement further including:

means for resetting said timing means when the level of said first signal is above the level of said reference signal.

17. The system as set forth in claim 15, the improvement further comprising:

d. means responsive to the level-detecting means of means (b) for preventing or allowing the gating into conduction of said main silicon controlled rectifier by said main pulse generator when the level of said first signal is above or below, respectively, the level of said reference signal.

18. In a system as set forth in claim 17, the improvement further comprising:

c. means responsive to the presence of plug current for causing said commutation pulse generator to gate said commutating silicon controlled rectifier into conduction prior to the normal predetermined time.

19. The system as set forth in claim 17, the improvement further comprising:

e. means responsive to the presence of plug current for generating a fixed level voltage when plug current is present, f. means utilizing said fixed level voltage to cause said commutation oscillator to gate said commutating silicon controlled rectifier into conduction prior to the normal predetermined time.

20. The system as set forth in claim 2, the improvement further comprising:

d. means responsive to the presence of plug current for causing said commutation pulse generator to gate said commutating silicon controlled rectifier into conduction prior to the normal predetermined time during presence of plug current.

21. The system as set forth in claim 1, the improvement further comprising:

d. means responsive to the presence of plug current for causing said commutation pulse generator to gate said commutating silicon controlled rectifier into conduction prior to the normal predetermined time during presence of plug current.

* * * * *